INVENTOR
James S. Reed

United States Patent Office 3,425,196
Patented Feb. 4, 1969

3,425,196
LAWN MOWER HAVING A REMOVABLE
ENDLESS CUTTER
James S. Reed, 1435 Engel Road,
Lawrence, Kans. 66044
Filed Nov. 10, 1965, Ser. No. 507,153
U.S. Cl. 56—25   5 Claims
Int. Cl. A01d 55/24, 35/12

ABSTRACT OF THE DISCLOSURE

A mower including a removable cutting assembly comprising an endless, fleixble, serrated belt trained over rollers for cutting of material when juxtaposed stretches of the belt are moved transversely of the path of travel of the mower. A flexible drive permits removal of the cutting assembly from the frame for auxiliary trimming purposes. Releasable latching components securing the assembly to the frame are vertically adjustable for height of cut adjustment.

Figure 1:
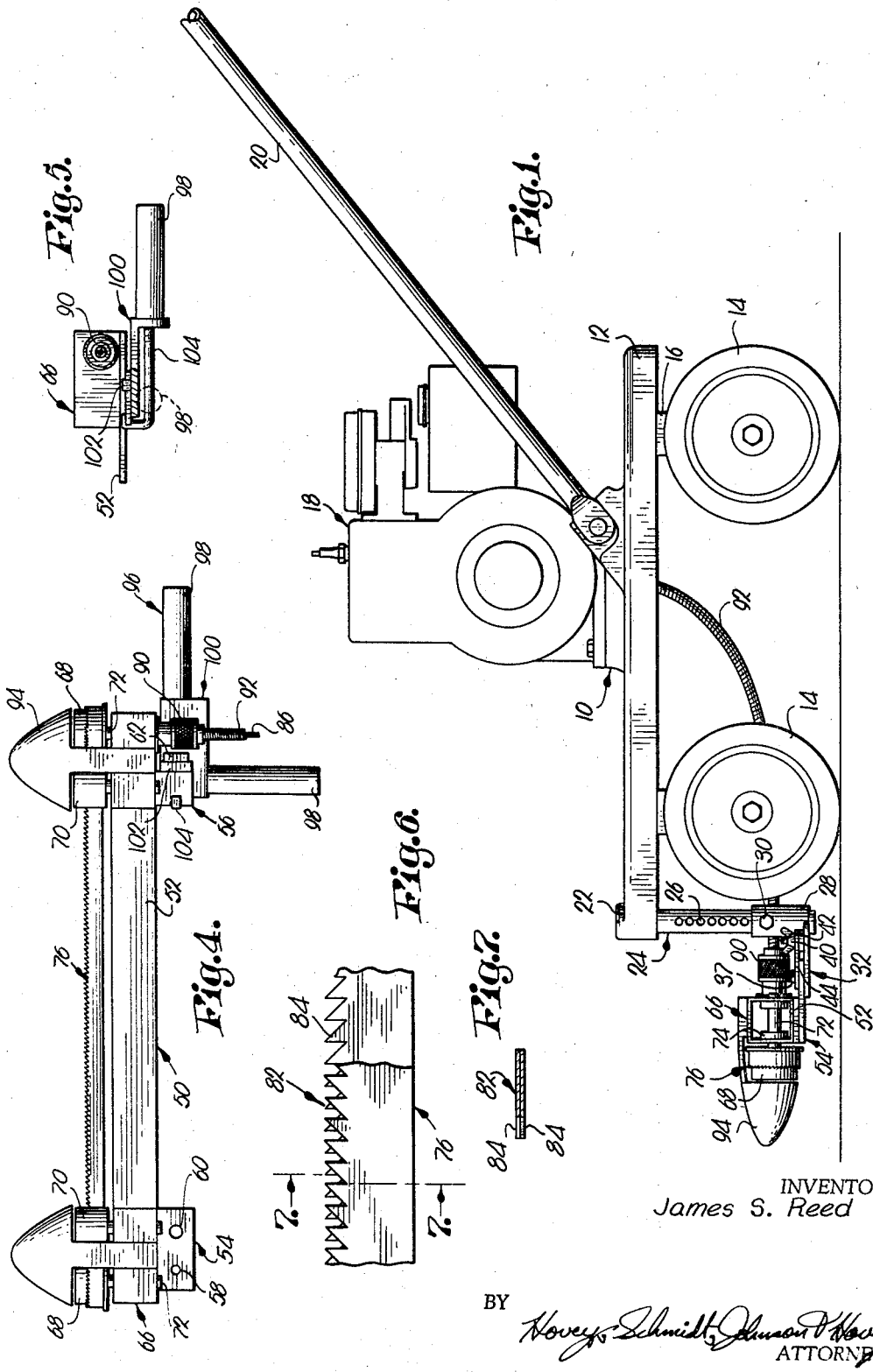

This invention relates to lawn mowing apparatus and, more particularly, to a combination lawn mower and hedge trimmer.

It is the primary object of this invention to provide a lawn mower wherein the cutting assembly thereof is designed to permit operation either as a lawn mower or as a hedge trimmer. In this respect, the cutting mechanism is mounted on a mobile frame suitable for lawn mowing purposes, but is also readily releasable from the frame to permit use of the mechanism for hedge trimming or other auxiliary cutting operation.

From the foregoing it will be realized that the cutting assembly must be relatively light and easily handled when removed from the frame of the lawn mower and, therefore, it is an important object of the present invention to provide a lawn mower cutting assembly having structure which is inherently adapted for utilization in the aforementioned manner and thus comprises a compact, lightweight unit which may be easily removed from the main frame by the operator for auxiliary cutting operations.

Another object of the instant invention is to provide a lawn mower having an extremely safe cutting mechanism so that the risks of injury resulting from operation of the machine are reduced to a minimum. To this end, the cutting is performed by a novel, serrated, endless band which is particularly adapted for disposing portions thereof in juxtaposed, traversing relationship to achieve a shearing type cutting action. The band has a continuous linear, cross-sectional configuration for facilitating the juxtaposed traversing movement of the blade and thus, smoothness of operation is assured and maintenance problems are minimized.

A yet further object of the invention is to provide a combination lawn mower and hedge trimmer wherein the cutting assembly thereof is coupled to the power supply by a flexible drive means to permit optimum maneuverability of the cutting assembly when it is detached from the frame for hedge trimming or similar operations.

Figure 2:
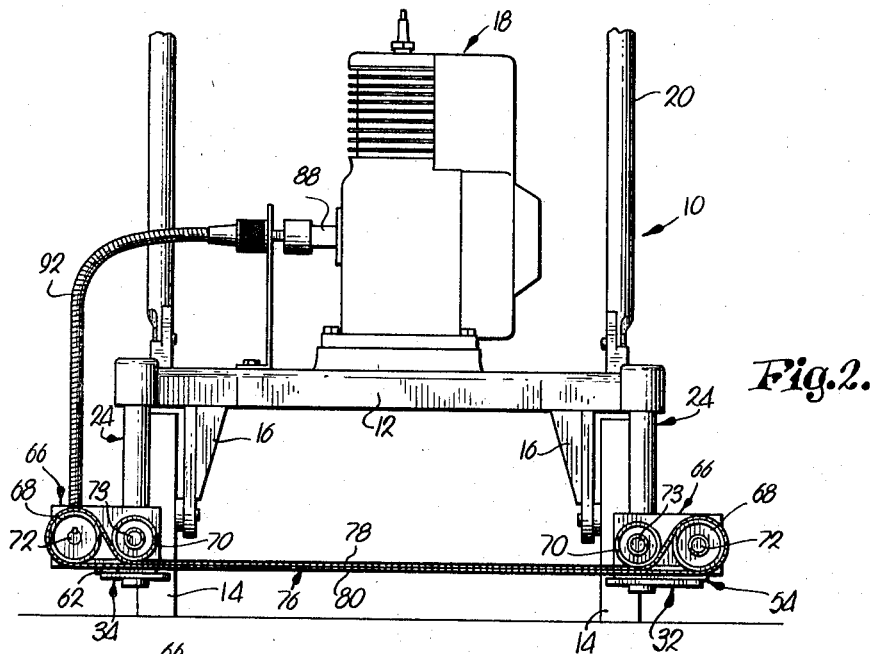
Figure 3:
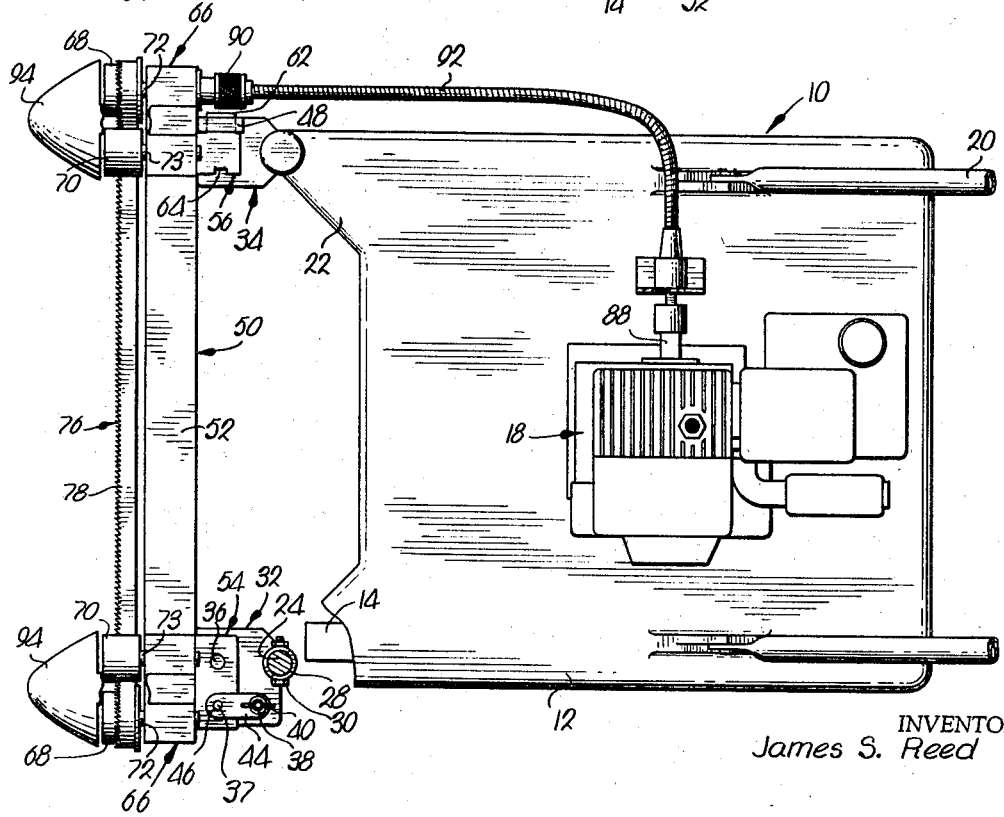

In the drawing:

FIGURE 1 is a side elevational view of a lawn mower made pursuant to the teachings of my invention; FIG. 2 is a front elevational view thereof, the grass deflectors being removed to reveal details of construction; FIG. 3 is a plan view thereof, parts being broken away and shown in section to reveal details of construction; FIG. 4 is a plan view of the cutting assembly detached from the frame and showing the auxiliary handle affixed to the assembly; FIG. 5 is a fragmentary, side elevational view thereof; FIG. 6 is a fragmentary, enlarged, plan view of the cutting band; and FIG. 7 is a cross-sectional view taken along line 7—7 of FIG. 6.

The lawn mower of the present invention, broadly designated by the reference numeral 10, includes a substantially rectangular, planar frame 12 supported by four wheels 14 which are inset for mounting on the lower surface of frame 12 by brackets 16. A gasoline engine 18 or other suitable prime mover is carried on the upper surface of frame 12, and a handle 20 is secured to frame 12 as is conventional. Frame 12 has a pair of opposed triangular webs 22 at the forward edge thereof, there being a post 24 depending from each web and having a plurality of apertures 26 formed therein.

Each post 24 is provided with a circumscribing sleeve 28 which is retained on post 24 by a bolt 30 extending through sleeve 28 and one of the apertures 26 (FIGS. 1 and 3). Sleeves 28 are provided with respective horizontal latching plate components 32 and 34 rigidly secured to the lowermost ends of the corresponding sleeves 28. Latching plate 32 is provided with three spaced, upright pins 36, 37 and 38, the latter being threaded to receive a wing nut 40. A washer 42 is received over pin 38 and disposed proximal plate 32, and a swingable strap 44 is swingably received on pin 38 between wing nut 38 and washer 42, there being an opening 46 formed in the free end of strap 44. A U-shaped loop 48 is secured to the upper surface of latching plate 34.

A cutting assembly, broadly designated by the reference numeral 50, is mounted on frame 12 by readily releasable structure which includes a transversely extending cross member 52 having a pair of horizontal, rearwardly extending locking plates 54 and 56 at the opposed ends of member 52. Locking plate 54 has a pair of openings 58 and 60 formed therein which are spaced for complementally telescoping over pins 36 and 37 respectively. Locking plate 56 is provided with an ear 62 adapted to extend through loop 48, and a notch 64 is formed in the inner edge of plate 56 as shown in FIG. 3. Notch 64 is provided to accommodate an auxiliary handle as will be hereinafter explained.

Each end of cross member 52 carries a sleeve 66 having a substantially square, transverse, cross-sectional configuration, and each sleeve 66 is provided with a primary roller 68 mounted on a stub shaft 72 extending through respective sleeves 66 for rotation about a corresponding horizontal axis by bearings 74. Each sleeve 66 also is provided with an idler roller 70 spaced inwardly from the corresponding primary rollers 68 and mounted on respective stub shafts 73 which extend parallel to shafts 72.

An endless, flexible, serrated blade or band 76 is trained over primary rollers 68 and frictionally retained thereby to present normally upper and lower horizontally extending stretches 78 and 80 respectively. Each end of stretch 78 is directed between a respective primary roller 68 and an idler roller 70 to dispose stretches 78 and 80 in juxtaposed relationship.

Band 76, shown in detail in FIG. 6, has a serrated forward edge 82 comprising a plurality of teeth 84. It will be noted from FIG. 7 that teeth 84 have no set or angular inclination with respect to band 76 and thus a continuous linear cross-sectional configuration is presented by the planar stretches 78 and 80, with the stretches having parallel serrated edges 82.

A flexible cable 86 interconnects the shaft 72 of the left primary roller 68 as viewed in FIG. 2 to the drive shaft 88 of motor 18. Cable 86 is connected to stub shaft 72 of primary roller 68 by a coupling 90, there being a protective flexible housing 92 telescoped over cable 86.

In use, with the cutting assembly mounted on frame 12, as shown in FIGS. 1–3, cutting assembly 50 is in position for lawn mowing purposes, and to this end, motor 18 is operated to rotate drive shaft 88, causing a corresponding rotation of cable 86 and driven primary roller 68. Band 76 is frictionally driven in response to rotation of driven primary roller 68. As band 76 moves, stretches 78 and 80 continuously traverse each other causing corresponding teeth 84 to cross to effect a cutting or shearing action therebetween. Thus, when lawn mower 10 is moved along its path of travel, grass is clipped or cut by the traversing teeth 84. A bumper or deflector 94 secured to each sleeve 66 and positioned forwardly thereof serves to prevent clogging of rollers 68 and 70 by grass or the like.

It is noteworthy that stretches 78 and 80 may traverse each other without interlocking or causing damage to teeth 84 since the teeth 84 lie in the plane of band 76, thereby assuring smooth operation of the cutting assembly 50. Stretches 78 and 80 may therefore be in intimate contact with each other to effect optimum shearing action. The left primary roller 68 may be made adjustable toward and away from driven primary roller 68 by slots (not shown) in the corresponding sleeve 66. The means for adjustment forms no part of the invention per se, will be readily perceived by those skilled in this art and, hence, need not be illustrated in detail. The adjustment may be provided to compensate for slight variations in band length.

Wheels 14 are located behind cutting portions of band 76 to traverse that portion of the lawn upon which the grass has been cut. This protects against matting of uncut grass by the wheels which results in lack of uniformity in grass length.

For hedge trimming or like auxiliary cutting operations, cutting assembly 50 is readily detached from frame 12 by releasing wing nut 40 to permit swinging of strap 44 from its interlocked position with pin 37 and then withdrawing ear 62 from its latched engagement under loop 48. A handle 96 is then secured to the right end of cutting assembly 50 and handle 96 includes a pair of arms 98 interconnected by a plate 100, there being a loop 102 on the upper surface of plate 100. A spring-loaded hook 104 extends from one arm 98 so that handle 96 may be connected to cutting assembly 50 by inserting ear 62 through loop 102 and inserting the free end of hook 104 into notch 64. The compact, lightweight cutting assembly 50 is thereby adapted for hedge trimming or the like, the cutting assembly 50 being highly manipulatable by virtue of the flexible drive means provided by cable 86.

Cutting assembly 50 may be quickly remounted on frame 12 simply by detaching handle 96 from assembly 50 and then interlocking the complemental latching components. Adjustment of cutting assembly 50 for varying the height of cut is accomplished by releasing bolts 30 and shifting sleeves 28 along post 24 and then reinserting bolts 30 through suitable apertures 26.

Having thus described the invention, what is claimed as new and desired to be secured by Letters Patent is:

1. A mower comprising:
a mobile frame;
a cutting assembly including a pair of opposed primary rollers mounted on respective sides of said frame, an endless, flexible serrated band trained over and frictionally retained by said rollers to dispose said band transversely of the path of travel of said frame and to present normally upper and lower stretches of the band between the rollers, and means for directing said stretches into juxtaposed relationship;
means including readily releasable structure mounting the cutting assembly on the frame; and
mechanism mounted on said frame and coupled to said rollers for rotating the latter and thereby said band to effect traversing movement of said stretches for cutting by the band as the frame is moved along its path of travel, said mechanism including power means and flexible drive means coupling the power means to said assembly, said structure including an elongated cross member carrying said rollers, said cross member having latching components on the opposed ends thereof proximal said rollers, and complemental latching components on said frame for interlocking with said components on the member, said complemental latching components being releasably coupled to said frame for relative vertical adjustment so that said assembly may be adjusted vertically.

2. Apparatus as set forth in claim 1, wherein said serrated band has a continuous linear cross-sectional configuration to present a pair of planar stretches having parallel, serrated edges.

3. Apparatus as set forth in claim 2, wherein said directing means comprises a pair of idler rollers mounted in horizontally spaced relationship to corresponding primary rollers with the lowermost surfaces of all of said rollers lying substantially in a common plane so that the opposed ends of said upper stretch may be directed between corresponding primary and idler rollers for disposing said upper stretch in juxtaposed, overlying relationship to said lower stretch.

4. The invention of claim 1, wherein said frame is supported by a plurality of wheels, each of which is inset for travel behind the juxtaposed cutting stretches of said band.

5. A mower comprising:
a mobile frame;
a cutting assembly mounted on said frame by readily releasable structure, said assembly including a pair of opposed rollers mounted on respective sides of said frame, an endless, flexible cutting blade trained over said rollers for rotation therewith, said blade being disposed transversely of said frame and presenting normally upper and lower stretches of the blade between the rollers, and means for directing said stretches into juxtaposed relationship; and
mechanism mounted on said frame and coupled to said rollers by flexible drive means for rotating the latter and thereby said band to effect traversing movement of said stretches for cutting by the blade as the frame is moved along its path of travel, said assembly being detachable from said frame for relative free movement thereof with said drive means for auxiliary cutting operation, said releasable structure including latching components releasably coupled to the frame for relative vertical adjustment so that said assembly may be adjusted vertically to vary the cutting height thereof.

References Cited

UNITED STATES PATENTS

| | | | |
|---|---|---|---|
| 845,547 | 2/1907 | Hathaway | 56—290 |
| 2,458,200 | 1/1949 | Renfroe et al. | 56—26.5 |
| 2,502,943 | 4/1950 | Gordon | 56—26.5 |
| 2,575,038 | 11/1951 | Banka | 56—26.5 XR |
| 2,790,292 | 4/1957 | Trecker | 56—25 |
| 2,934,874 | 5/1960 | Lintz et al. | 56—25 |

RUSSELL R. KINSEY, *Primary Examiner.*

U.S. Cl. X.R.

56—244